United States Patent [19]
McMahan et al.

[11] Patent Number: 5,498,935
[45] Date of Patent: Mar. 12, 1996

[54] LASER FLASH LAMP CONTROL SYSTEM

[75] Inventors: William H. McMahan, P.O. Box 636, 14966 State Hwy. 410, Robertson, Wyo. 82944; Kevin W. Gordon, American Fork, Utah

[73] Assignee: William H. McMahan, Robertson, Wyo.

[21] Appl. No.: 152,180

[22] Filed: Nov. 12, 1993

[51] Int. Cl.⁶ .................................................. H05B 37/00
[52] U.S. Cl. ............................................ 315/241 P; 606/12
[58] Field of Search ........................... 315/241 P, 241 S; 606/12, 11; 356/5; 435/945

[56] References Cited

U.S. PATENT DOCUMENTS

| | | | |
|---|---|---|---|
| 4,603,973 | 8/1986 | Crow | 356/5 |
| 4,950,268 | 8/1990 | Rink | 606/12 |

*Primary Examiner*—Robert J. Pascal
*Assistant Examiner*—Reginald A. Ratliff
*Attorney, Agent, or Firm*—Thorpe, North & Western

[57] ABSTRACT

An apparatus and method for controlling the current delivered to a flash lamp is disclosed. The apparatus and method is particularly useful for controlling the current delivered to a flash lamp used in a laser and most particularly useful in connection with lasers used for medical procedures. The apparatus controls the length of the electrical pulse which is delivered to the flash lamp and also limits the current which passes through the flash lamp to that which is desired for optimized operation. A semiconductor switch electrically connects and disconnects the flash lamp from one or more capacitors for the desired length of time. The length of time can be automatically adjusted to provide the desired flash lamp output and thus the desired laser output. The switch provides substantially a square wave having a plateau voltage with very fast rise and fall times on both sides of the plateau so that a suitable square wave is formed. The semiconductor switch also limits the value of the current passing through the flash lamp to a substantially predetermined value so that the operation of the lamp is optimized.

38 Claims, 2 Drawing Sheets

LASER FLASH LAMP CONTROL SYSTEM

BACKGROUND

1. The Field of the Invention.

This invention relates to apparatus and methods for powering a laser flash lamp. More particularly, the present invention relates to apparatus and methods for controlling the power delivered to the flash lamp of a laser used in medical procedures.

2. The Background Art.

Lasers have become ubiquitous in modern society. In the case of lasers used in many medical procedures, a relatively high power laser pulse must be output from the laser in order to treat the desired tissue. Desirably, lasers which output high power, ultra short pulses (on the order of 10 or less nanoseconds) treat tissue by an explosive, opto-acoustical mechanism rather than bulk tissue heating. The high power, ultra short pulses act to pinpoint the impact of the laser to a very small area. Lasers can also be selected to have characteristics which allow medical treatments to be carried out which would not otherwise be possible. For example, by properly selecting the wavelength of the laser, the laser beam can pass through some tissue without damaging that tissue while it is preferentially absorbed by other tissue which is to be treated.

In order to provide a high output from the lasers commonly used in medical applications, a high voltage electrical pulse of the proper duration, e.g., on the order of hundreds of microseconds, is applied to a flash lamp which pumps energy into the laser medium. In order to provide the high voltage pulse, it is common to utilize one or more large capacitors which are charged up to, or above, the necessary voltage and then discharged into a pulse forming network. As is known in to art, a pulse forming network utilizes passive components to provide the required square wave pulse.

In some cases, a longer square wave pulse is needed in order to prompt the laser to output two or three pulses of the laser beam rather than a single laser beam pulse. In such cases, the previously available schemes merely charge the capacitor or capacitors to a higher voltage which is then discharged into the pulse forming network. The higher voltage results in a longer pulse output from the pulse forming network but also results in significantly increased current passing through the flash lamp. The increased current causes undesirable wear of the flash lamp and decrease in the useful life of the flash lamp without providing any desirable result. Moreover, the increased current delivered to the flash lamp may cause an undesirable increase in the output of the laser; a dangerous result in the case of medical lasers. Also, efforts to compensate for the changes in current delivered to the flash lamp when using a pulse forming network may result in the output of the laser beam being inconsistent from laser beam pulse to laser beam pulse. All of these factors result in a less precisely controlled laser pulse and shortened flash lamp life.

Even further, as the flash lamp ages, the length of the electrical pulse needed to produce the same output from the laser must be increased. In the previous scheme using pulse forming networks, the maximum length of the electrical pulse is fixed; when the pulse required to appropriately fire the flash lamp exceeds the maximum output of the pulse forming network it is necessary to replace the flash lamp; an undesirably expensive procedure.

In view of these disadvantages, it would be an advance in the art to provide an improved laser flash lamp control apparatus and method.

BRIEF SUMMARY AND OBJECTS OF THE INVENTION

In view of the above described state of the art, the present invention seeks to realize the following objects and advantages.

It is a primary object of the present invention to provide an apparatus and method for precisely controlling the energy delivered to a laser flash lamp.

It is also an object of the present invention to provide an apparatus and method for adjusting the length of a pulse delivered to a flash lamp to compensate for the changing characteristics of the lamp which are encountered during the life of the lamp.

It is a further object of the present invention to provide an apparatus and method for limiting the current delivered in a pulse to a flash lamp.

It is another object of the present invention to provide an apparatus and method for prolonging the useful life of a flash lamp.

It is a further object of the present invention to provide an apparatus and method for measuring the change in performance of a flash lamp and adjusting the energy input to the lamp to maintain its output at the desired level.

It is also an object of the present invention to provide an apparatus and method for adjusting the duty cycle of a pulse or pulses delivered to a laser flash lamp.

It is still another object of the present invention to provide an apparatus and method for precisely forming a square wave which is input to a laser flash lamp.

It is yet a further object of the present invention to provide an apparatus and method for compensating for changes in the output of the laser caused by variables, e.g., dirt, which occur in the optics of a laser.

It is also an object of the present invention to provide an apparatus and method for delivering a controlled energy pulse, adjustable in both current and length, to the flash lamp of a Q switched Nd:YAG laser which is no more than required to produce the desired laser output.

These and other objects and advantages of the invention will become more fully apparent from the description and claims which follow, or may be learned by the practice of the invention.

The present invention provides an apparatus and method for controlling the current delivered to a flash lamp. The present invention is particularly useful for controlling the current delivered to a flash lamp used in a laser and most particularly useful in lasers used for medical procedures. In a commonly used laser, the Q switched Nd:YAG laser, a flash lamp inputs a pulse into the laser medium. The current which is passed through the flash lamp, in the form of a square wave pulse, and the duration of the current pulse, which is generally on the order of hundreds of microseconds long, is critical to the operation of the flash lamp and thus to output of the laser.

The present invention provides that the length of the pulse can be controlled while also limiting the current which passes through the flash lamp to that which is desired for optimized operation. In its preferred embodiments the present invention includes a supply means for providing a voltage. The supply means preferably provides a voltage being at least as great as 200 volts and more preferably 400 or 800 volts.

A capacitive means stores electrons, or charge, received from the supply means. The stored electrons or charge will later be controllably discharged into the flash lamp. A control means determines when the flash lamp should be turned on and turned off and generates a control signal to convey the length of time the current should pass through the flash lamp to other apparatus components. The control means is preferentially carried out by a microprocessor and appropriate programming code and associated components.

A switching means electrically connects the capacitive means to the flash lamp for the duration of time specified by the control signal. The switching means provides an output which is substantially a square wave having a plateau voltage with very fast rise and fall times on both sides of the plateau so that a suitable square wave is formed. The length of the square wave can be adjusted in accordance with the control signal. The switching means also limits the value of the current passing through the flash lamp to substantially a predetermined value so that the operation of the lamp is optimized. The switching means is preferably carried out using a semiconductor device having the necessary current and voltage handling capacity while still providing ultra fast switching.

In accordance with another aspect of the present invention, an apparatus and method for automatically adjustably controlling the output of a laser is also provided. A means for measuring the output of the laser allows the length of the current pulse and the current delivered to the flash lamp to be automatically adjusted to keep the output of the laser at the desired level. A means for optically attenuating the output of the laser is also preferably included to keep the output of the laser at the desired level.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
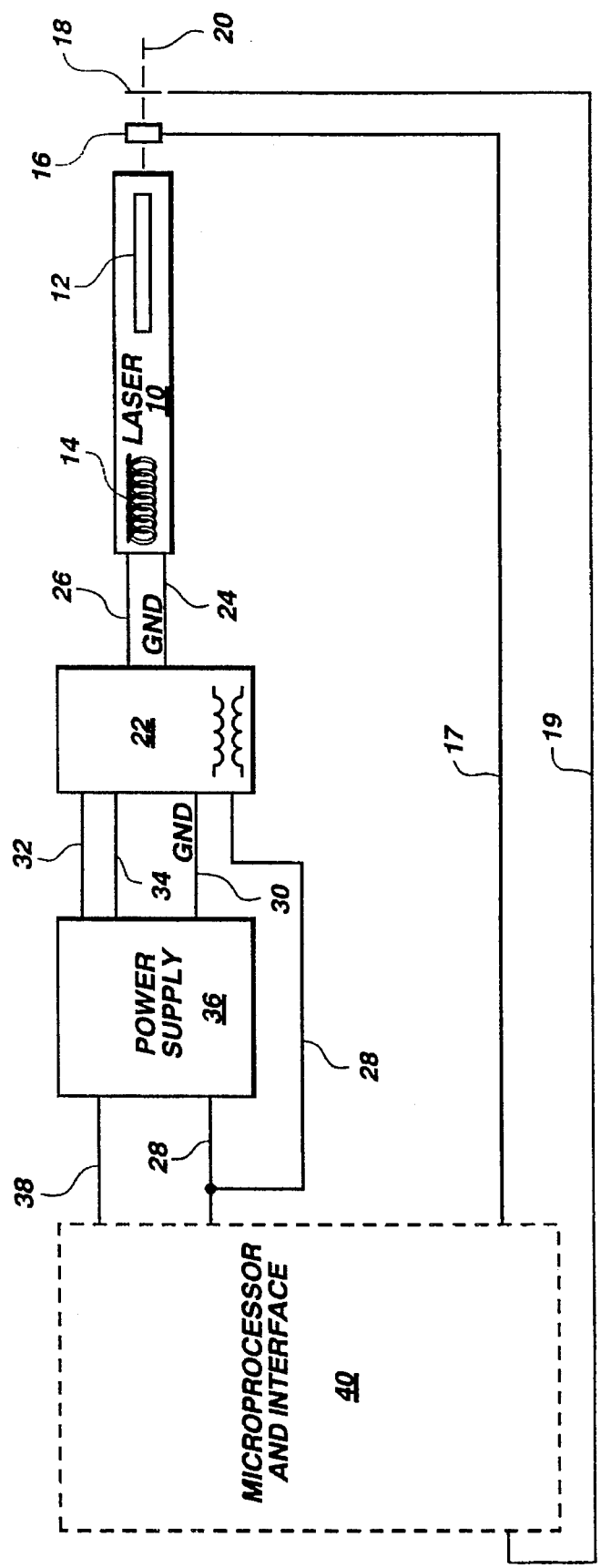
FIG. 1 is a block diagram of a presently preferred arrangement of a laser system incorporating the invention.

Reference will now be made to FIG. 1 which is a block diagram of a medical laser system incorporating the present invention. It will be appreciated that, for increased clarity, the diagram of FIG. 1 is a simplified high level representation of a medical laser and that the details omitted therein can be supplied by those skilled in the art. Represented in FIG. 1 is a laser 10. The laser 10 includes a laser medium 12 and a flash lamp 14. The laser 10 can be one of many available in the art or can be fabricated to suit particular applications.

In the present example, the laser 10 is preferably an Nd:YAG (neodymium:yttrium aluminum garnet) laser utilizing Q switching techniques. The use of Q switching techniques, known in the art, generates one, two, or three ultra short pulses (each on the order of a few nanoseconds) from the laser 10 for a single pulse of the flash lamp 14. If two ultra short pulses are desired from the laser 10 then the electrical pulse delivered to the flash lamp must be longer than if a single laser beam pulse is desired; if three ultra short pulses are desired an even longer electrical pulse must be delivered to the flash lamp 14.

The ultra short pulses produced by a Q switched Nd:YAG laser are particularly useful in ophthalmic treatments such as posterior capsulotomy procedures and posterior membranectomy. As known in the art, a medical laser outputs the laser beam to other optical components, not represented in FIG. 1, for example a slit lamp for ophthalmic treatments or to a flexible optical fiber.

In order to provide a high voltage pulse needed to fire the flash lamp 14, a transformer circuit 22, also referred in the art as a trigger module, is provided. The high voltage pulse output from the transformer circuit 22 is conveyed to the flash tube 14 via a line 26 with a ground connection being provided by a line 24. A microprocessor and interface circuit 40, which can readily be arrived at by those skilled in the art using the teachings given herein, provide the control signals which are necessary to operate the laser 10 in the desired fashion and to carry out the present invention as will be explained shortly. For purposes of explaining the present invention, the microprocessor and interface circuit 40 is represented as providing an enable line 38 and a trigger line 28 upon which is communicated a triggering signal.

An intensity detector 16 is placed so that the actual intensity of the laser beam 20 exiting the laser 10 can be measured. The intensity detector 16 can be readily fabricated by those skilled in the art. For example, the intensity detector 16 can preferably comprise a beam splitter and a photodetector (neither shown in the figures) to output a signal on line 17 to the microprocessor and interface circuit 40.

An attenuation device 18 is used to decrease the intensity of the laser beam 20. The attenuation device 18 can be devised by those skilled in the art to receive a signal on line 19 from the microprocessor and interface circuit 40 in order to decrease the intensity of the laser beam 20 as desired.

A power supply 36 preferably provides a ground connected to line 30, a sustain voltage on line 32, and a firing voltage on line 34. The lines 30, 32, and 34 are each connected to the transformer circuit 22. The firing voltage is the voltage which is required by the transformer circuit 22 to fire, i.e., to start, the flash lamp 14. The sustain voltage carried on line 32 is used to sustain the illumination of the flash lamp 14 after it has fired. Thus, once the firing voltage has started the illumination of the flash lamp 14, the length of the sustain voltage will determine the time the flash lamp 14 remains on.

As is known in the art, the pulse which sustains the flash lamp 14 should be as close as possible to a perfect square wave, i.e., instantaneous rise time, no overshoot, no ripple on the plateau of the square wave, and instantaneous fall time. As explained earlier, the previously available schemes used a pulse forming network. The pulse forming network generally consisted of passive capacitive, resistive, and/or inductive components. Prior pulse forming networks merely received the discharge of one or more capacitors as an input and then output a reasonably good approximation of a square wave. Also, when a longer square wave pulse was needed, the capacitor or capacitors were charged to a higher voltage and then discharged into the pulse forming network. The higher voltage discharged into the pulse forming network results in a longer pulse being output but also undesirably results in more current being delivered to the flash lamp 14 than necessary. Disadvantageously, there is no practical way to change the duty cycle of the square wave which is output from the pulse forming network once it is constructed.

As known in the art, as the flash lamp 14 is used the energy necessary to fire it increases. Thus, with the previously used schemes, once the energy required to fire the flash lamp 14 exceeds the energy which can be provided by the pulse forming network, the flash lamp 14 must be replaced. As is known in the art, replacement of the flash lamp 14 is an undesirably expensive procedure.

In contrast to the previously used schemes, the present invention allows the energy which is delivered to the flash lamp 14 to be adjusted. The preferred power supply 36 of the present invention adjusts the amount of energy delivered to the flash lamp 14 by limiting the amount of current delivered to the flash lamp 14 and by limiting the length of the square wave. By limiting the amount of current delivered to the flash lamp 14 and by limiting the length of the square wave to only that necessary to appropriately fire the flash lamp 14, unnecessary deterioration of the flash lamp 14 is avoided. Thus, the useful life of the flash lamp 14 is maximized and the output of the flash lamp 14, and thus the laser 10, is more consistent than when the previous used pulse forming network is utilized.

The power supply 36 of the present invention utilizes one or more active components as a switch to rapidly turn on and turn off the current flow to the flash lamp 14. The power supply 36 also limits the current delivered to the flash lamp 14. Thus, the power supply 36 can selectively deliver a square wave pulse of, for example 250 microseconds, 350 microseconds, or 450 microseconds, while maintaining the current delivered to the desired amount, for example 50 amps.

The power supply 36 outputs a firing voltage on line 34, for example 800 volts, which is input to the transformer circuit 22. The firing voltage is a short pulse which is stepped up from the firing voltage, e.g., 800 volts, by the transformer circuit 22 to the voltage, e.g., 15,000 volts, necessary to strike an arc through the gas in the flash lamp 14.

The power supply 36 also outputs a sustain voltage, for example 400 volts DC, on line 32. Other voltages may also be used but generally the sustain voltage will be close to about 400 volts. It is the length of time which the sustain voltage is applied to the flash lamp 14 which determines the length of time the flash lamp 14 is illuminated. The sustain voltage is desirably a square wave pulse which is output from the power supply 36 and has a rise time preferably not greater than about 200 nanoseconds and most preferably not greater than about 100 nanoseconds. The square wave pulse sustain voltage which is output from the power supply 36 has a fall time preferably not greater than about 200 nanoseconds and most preferably not greater than about 400 nanoseconds. Thus, it will be appreciated that the sustain voltage is "turned on" and "turned off" very quickly.

The power supply 36 also limits the current delivered to the flash lamp 14 to the desired amount while it is illuminated regardless of the length of the square wave pulse which is output to sustain the illumination. Further details regarding the current limiting function will be provided shortly. Moreover, in the case of a Q switched laser, the current input to the flash lamp 14 will alter when the laser medium 12 will "switch" or "fire." If, for example, 60 amps is passed through the flash lamp 14 to cause the laser medium to "switch on" and produce a laser beam pulse at 150 microseconds after the application of the firing voltage is applied to the flash lamp 14, then, raising the current to 80 amps may cause the laser 10 to produce a laser beam pulse at 100 microseconds after firing of the lamp. Importantly, the firing of the laser 10 should be consistent from use to use so it is very desirable to control the amount of current passing through the flash lamp 14 regardless of the length of time current is passed through the flash lamp 14.

As a result of the present invention's being able to adjust the length of time the sustain voltage is applied to the flash lamp 14 and limit the current delivered to the flash lamp 14 to the desired amount, i.e., the present invention adjusts the energy which is delivered to the flash lamp 14, the output of the laser 10 is more consistent than when previous schemes are used. Limiting the energy delivered to the flash lamp 14 to just that necessary to sustain the illumination of the flash lamp 14 prolongs the useful life of the flash lamp 14. Moreover, the energy delivered to the flash lamp 14 can be adjusted to compensate for changes in the output of a laser system.

In accordance with another aspect of the present invention, the power of the laser beam 20 is measured and the energy delivered to the laser by the power supply 36 is automatically adjusted, i.e., the length of time which the flash lamp 14 is illuminated, to keep the output of the laser 10 at the desired level. Using techniques known in the art, the microprocessor and interface circuit 40 utilize the intensity detector 16 to measure the actual output of the laser 10. The location of the intensity detector 16 in the optical path of the laser beam 20 can be selected in accordance with the desired result. For example, the intensity detector 16 can be positioned after other optical components used to deliver the laser beam 20 in order to compensate for dirt which accumulates on, and imperfections in, such optical components. The attenuation device 18 is also preferably used to adjust the output of the laser 10.

The microprocessor and interface circuit 40 can readily be provided with the necessary programming code to carry out the functions of measuring the intensity of the laser beam 20 and automatically adjust the output of the power supply 26 to provide the desired laser output.

Figure 2:
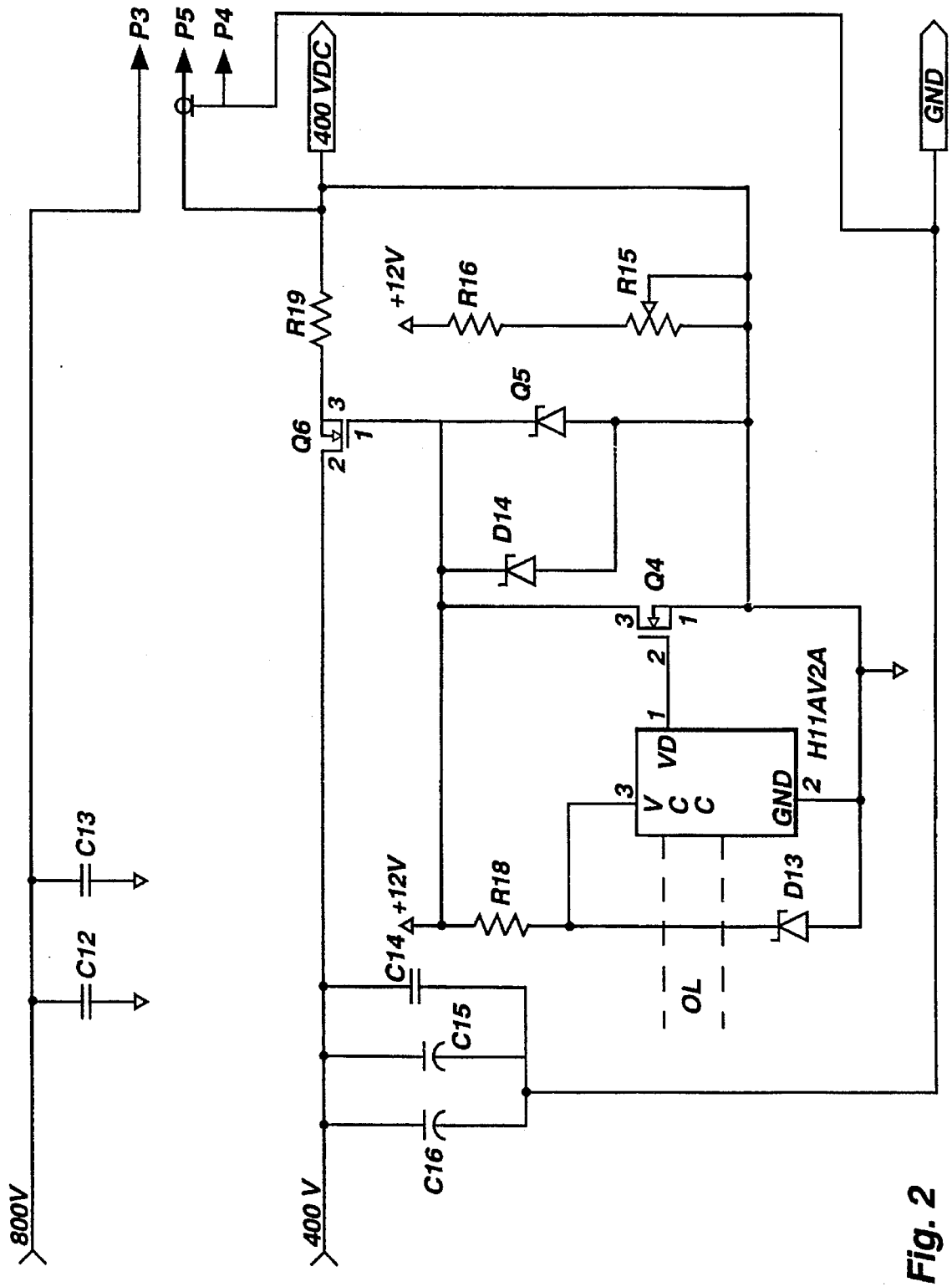
FIG. 2 is a detailed circuit schematic of one presently preferred arrangement of the present invention.

Reference will next be made to FIG. 2. FIG. 2 is a detailed circuit schematic representing the primary components which carry out the function of the power supply (32 in FIG. 1). It is to be understood that the representation of FIG. 2 is merely exemplary and that those skilled in the art, using the teachings set forth herein, can arrive at other possible arrangements which can be used to carry out the present invention.

As represented in FIG. 2, 800 volts DC (which is stepped up to thousands of volts, for example 10,000 to 20,000 volts DC, by the transformer circuit, 22 in FIG. 1, to provide a firing pulse) and 400 volts DC (which is output as a square wave pulse for the proper length of time and is also current limited) are both provided to the circuit. The 800 volts and the 400 volts are preferably well regulated and supplied from any number of schemes now known, or known in the future, to carry out this function. The capacitors C15 and C16 are preferably large capacitors which store electrons which will be conveyed to the flash lamp (14 in FIG. 1). An optocoupler, preferably one designated H11AV2A in the art, receives an optical link (OL) from other system components, for example the microprocessor and interface circuit (40 in FIG. 1). The optocoupler functions to isolate the components represented in FIG. 2 from other system components. The output $V_D$ of the optocoupler is communicated to the gate of a FET Q4. When the optocoupler is on, the FET Q4 is also turned on which turns on a FET Q6.

The FET Q6 is a N-channel enhancement mode high voltage and high power MOSFET device. The FET Q6 can preferably be one of the devices available in the art from Applied Power Technology of Bend Oregon such as those referred to as APT5025BN, APT4525BN, APT5030BN, and APT4530BN. It will be appreciated that any device which can handle the voltage and current demands as well as provide a square wave pulse having appropriately fast rise and fall times can be used in accordance with the present invention. Other devices are also available, or may become available in the future, which can also perform the very fast switching necessary to generate the square wave pulse with sufficient power handling capacity. Further information regarding the preferred devices can be obtained from Advanced Power Technology of Bend, Oregon in the specification sheets for the POWER MOS IV™ series of devices available at the time of filing this application all of which are now incorporated herein by reference.

The FET Q6, and the components associated with it, determines the length of the square wave output pulse in accordance with the length of the OL signal. The FET Q6, and the components associated with it, also function to limit the current which is passed through the flash lamp (14 in FIG. 1) while the illumination of the flash lamp is being sustained.

How the arrangement represented in FIG. 2 limits the current output to the flash lamp (14 in FIG. 1) via connector P5 will now be explained. The resistor R19 is connected to the source of the FET Q6 and is in series with the flash lamp (14 in FIG. 1). The anode of the zener diode Q5 is connected from the gate of the FET Q6 to a location between the resistor R19 and the connector P5 leading to the flash lamp (14 in FIG. 1). The voltage drop across the zener diode Q5 determines the voltage applied to the gate of the FET Q6 and thus the current passing therethrough. As the current through the resistor R19 reaches the desired limit, the voltage drop across the resistor R19 will increase and the gate to source voltage of the FET Q6 will decrease, "turning off" the FET Q6, and further limiting the current passing through FET Q6. Thus, the circuit represented in FIG. 2 keeps the current through the flash lamp at the desired value regardless of the length of time which the FET Q6 is "turned on." Potentiometer R15 is used to set the value of the current passing through the FET Q6.

Provided below is a table listing the preferred values for the components represented in FIG. 2. It is to be understood that the preferred values, as well as the detailed circuit schematic represented in FIG. 2, are merely exemplary of the present invention and alternative arrangements for carrying out the present invention can be arrived out by those skilled in the art using the information set forth herein.

TABLE

| Reference Designation | Preferred Value |
| --- | --- |
| R15 | potentiometer 10 K ohm |
| R16 | 2 K ohm ¼ watt 5% |
| R18 | 220 ohm ¼ watt 5% |
| R19 | 0.1 ohm ¼ watt 5% |

TABLE-continued

| Reference Designation | Preferred Value |
| --- | --- |
| C12, C13, C14 | .1 µF 1000 volt film |
| C15, C16 | 100 µF 450 volt electrolytic |
| D13 | zener diode 5.1 volt 1N4733 Motorola |
| D14 | transzorb 1N6277A Motorola |
| Q4 | MOSFET VN10KM Siliconix |
| Q5 | diode voltage regulator (zener diode) TL431CLP Linear |
| Q6 | power MOSFET 26 amp 500 volts Advanced Power Technology |
| H11AV2A | Optical Isolator H11AV2A General Electric |
| P3, P4, P5 | coaxial plug |

In view of the foregoing, it will be appreciated that the present invention provides an apparatus method for precisely controlling and adjusting the electrical pulse delivered to a flash lamp thus allowing compensation for the changing characteristics of the lamp which are encountered during the life of the lamp. The present invention also provides an apparatus and method for prolonging the useful life of a flash lamp and for measuring changes in performance of a flash lamp and adjusting the energy input to the flash lamp to maintain its output at the desired level.

It will also be appreciated the present invention provides an apparatus and method for adjusting the duty cycle, and limiting the current of, an electrical pulse delivered to a laser flash lamp and for precisely forming a square wave which is input to a laser flash lamp. The present invention also provides an apparatus and method for compensating for dirt which accumulates on the optics of a laser and for controlling the energy delivered to the flash lamp of a Q switched Nd:YAG laser which is no more than required to produce the desired laser output.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for controlling the current delivered to a flash lamp, the apparatus comprising:

supply means for providing a first voltage, the first voltage being at least as great as 200 volts and for supplying a firing voltage, the firing voltage being at least as great as 400 volts DC;

capacitive means, connected to the supply means, for storing electrons;

means for stepping up the firing voltage to a voltage at least as great as 10,000 volts DC;

control means for determining when the flash lamp should be turned on and turned off, the control means generating a control signal; and switching means for electrically connecting the capacitive means to the flash lamp, the switching means providing an output which is substantially a square wave having a plateau voltage, the switching means limiting the value of the current passing through the flash lamp to substantially a predetermined value and the length of the square wave being adjustable in accordance with the control signal such that the length of the time which the flash lamp is illuminated can be precisely adjusted and the current passing through the flash lamp is limited to a desired value.

2. An apparatus as defined in claim 1 wherein the firing voltage is at least as great as 800 volts DC and the means for stepping up the firing voltage is for stepping up to a voltage at least as great as 20,000 volts DC.

3. An apparatus as defined in claim 1 wherein the control means comprises a microprocessor.

4. An apparatus as defined in claim 1 wherein the switching means exhibits a delay between initiation of the control signal and the rise of square wave to substantially the plateau voltage being not greater than about 100 nanoseconds and wherein the switching means exhibits a delay between the end of the control signal and the return of the square wave to substantially its previous voltage value is not more than about 200 nanoseconds, such that the output of the switching means precisely presents substantially a square wave controlling the illumination of the flash lamp.

5. An apparatus as defined in claim 1 wherein the plateau voltage is substantially equal to the first voltage.

6. An apparatus as defined in claim 1 wherein the switching means comprises a semiconductor device connected to the capacitive means such that the current through the semiconductor device passes through the flash lamp.

7. An apparatus as defined in claim 6 wherein the semiconductor device comprises a transistor and wherein the first voltage is at least about 400 volts and the current is at least 50 amps.

8. An apparatus as defined in claim 6 wherein the switching means further comprises an optical isolation device.

9. An apparatus for controlling the output of a laser used in medical procedures, the apparatus comprising:

a laser comprising a laser medium and a flash lamp configured to input energy to the laser medium, the laser operating in a Q switched mode whereby one, two, or three laser beam pulses are emitted for each illumination of the flash lamp, each pulse being less than 10 nanoseconds long, supply means for providing a first voltage, the first voltage being at least as great as 400 volts;

capacitive means, connected to the supply means, for storing a charge;

means for stepping up the first voltage to a voltage at least as great as 10,000 volts DC;

control means for determining when the flash lamp should be turned on and turned off in accordance with whether one, two, or three laser beam pulses are desired, the control means generating a control signal indicating the time the flash lamp should be turned on and turned off; and switching means for electrically connecting the capacitive means to the flash lamp for substantially the length of time indicated by the control signal, the switching means providing an output which is substantially a square wave having a plateau voltage, the switching means limiting the value of the current passing through the flash lamp to substantially a predetermined value and the length of the square wave being adjustable in accordance with the control signal such that the length of the time which the flash lamp is illuminated can be precisely adjusted and the current passing through the flash lamp is limited to a desired value.

10. A method for controlling the output of a laser used in medical procedures, the laser comprising a laser medium and a flash lamp configured to input energy to the laser medium, the laser operating in a Q switched mode whereby one, two, or three laser beam pulses are emitted for each illumination of the flash lamp, each pulse being less than 10 nanoseconds long, the method comprising the steps of:

supplying a first voltage which is at least as great as 400 volts;

storing a charge;

stepping up the voltage to at least 10,000 volts D.C.;

determining when the flash lamp should be turned on and turned off in accordance with whether one, two, or three laser beam pulses are desired and generating a control signal indicating the time the flash lamp should be turned on and turned off;

switching the charge in series with the flash lamp for substantially the length of time indicated by the control signal to provide an output which is substantially a square wave having a plateau voltage; and limiting the value of the current passing through the flash lamp to substantially a predetermined value with the length of the square wave being adjustable in accordance with the control signal such that the length of the time which the flash lamp is illuminated can be precisely adjusted and the current passing through the flash lamp is limited to a desired value.

11. An apparatus for adjustable controlling the output of a laser comprising:

a laser medium;

a flash lamp configured to input energy to the laser medium;

voltage supply means for providing a voltage at least as great as 200 volts and for supplying a firing voltage, the firing voltage being at least as great as 400 volts DC;

means for measuring the output the laser medium;

capacitive means, connected to the voltage supply means, for storing electrons;

means for stepping up the firing voltage to a voltage at least as great as 10,000 volts DC;

control means, connected to the means for measuring, for determining when the flash lamp should be turned on and turned off and for determining the current to be input to the flash lamp to set the output of the laser at a desired level, the control means generating a control signal; and switching means for electrically connecting the capacitive means to the flash lamp, the switching means providing an output which is substantially a square wave having a plateau voltage, the switching means limiting the value of the current passing through the flash lamp to substantially the value indicated by the control signal and the length of the square wave being adjustable in accordance with the control signal such that the length of the time which the flash lamp is illuminated can be adjusted and the current passing through the flash lamp can also be adjusted to yield a desired flash lamp brightness.

12. An apparatus for adjustably controlling the output of a laser as defined in claim 11 further comprising means for attenuating the laser output, the means for attenuating being connected to the control means.

13. An apparatus as defined in claim 11 wherein the firing voltage is at least as great as 800 volts DC and the means for stepping up the firing voltage is for stepping up a voltage to at least as great as 20,000 volts DC.

14. An apparatus as defined in claim 11 wherein the control means comprises a microprocessor.

15. An apparatus as defined in claim 11 wherein the switching means exhibits a delay between initiation of the control signal and the rise of square wave to substantially the plateau voltage being not greater than about 100 nanoseconds and wherein the switching means exhibits a delay between the end of the control signal and the return of the square wave to substantially its previous voltage value is not more than about 200 nanoseconds, such that the output of the switching means precisely presents substantially a square wave controlling the illumination of the flash lamp.

16. An apparatus as defined in claim 11 wherein the plateau voltage is substantially equal to the first voltage.

17. An apparatus as defined in claim 11 wherein the switching means comprises a semiconductor device connected to the capacitive means such that the current through the semiconductor device passes through the flash lamp.

18. An apparatus as defined in claim 17 wherein the semiconductor device comprises a transistor and wherein the first voltage is at least about 400 volts and the current is at least 50 amps.

19. An apparatus as defined in claim 17 wherein the switching means further comprises an optical isolation device.

20. A method for adjustable controlling the output of a laser to a desired level, the laser comprising a laser medium and a flash lamp configured to input energy to the laser medium, the method comprising the steps of:

firing the laser;

measuring the output the laser;

supplying a voltage at least as great as 800 volts;

storing a charge;

stepping up the voltage to at least 10,000 volts D.C.;

determining when the flash lamp should be turned on and turned off in order to adjust the output of the laser to the desired level and generating a control signal;

determining the current to be input to the flash lamp and setting the output of the laser at a desired level and generating a control signal; and switching the charge to be in connection with the flash lamp for a period of time indicated by the control signal and outputting a square wave having a plateau voltage, the value of the current passing through the flash lamp being limited to substantially the value indicated by the control signal and the length of the square wave being adjustable in accordance with the control signal such that the length of the time which the flash lamp is illuminated can be adjusted and the current passing through the flash lamp can also be adjusted to yield a desired flash lamp brightness.

21. An apparatus for controlling the current delivered to a flash lamp supplying optical energy to a laser medium, the laser medium selectively firing either a single lasing pulse or a plurality of lasing pulses, the apparatus comprising:

supply means for providing a first voltage, the first voltage being at least as great as 200 volts;

capacitive means, connected to the supply means, for storing electrons;

control means for determining when the flash lamp should be turned on and turned off, the control means generating a control signal, the control signal indicating whether the flash lamp should be illuminated to provide a single firing of the lasing medium or a plurality of firings; and switching means for electrically connecting the capacitive means to the flash lamp, the switching means providing an output which is substantially a square wave having a plateau voltage, the switching means limiting the value of the current passing through the flash lamp to substantially a predetermined value and the length of the square wave being adjustable in accordance with the control signal such that the length of the time which the flash lamp is illuminated can be precisely adjusted and the current passing through the flash lamp is limited to a desired value, the switching means providing the square wave causing the illumination of the flash lamp and the firing of either a single lasing pulse or a plurality of lasing pulses upon command of a user.

22. An apparatus as defined in claim 21 further comprising:

means for supplying a firing voltage, the firing voltage being at least as great as 400 volts DC; and means for stepping up the firing voltage to a voltage at least as great as 10,000 volts DC.

23. An apparatus as defined in claim 21 wherein the control means comprises a microprocessor.

24. An apparatus as defined in claim 21 wherein the switching means exhibits a delay between initiation of the control signal and the rise of square wave to substantially the plateau voltage being not greater than about 100 nanoseconds and wherein the switching means exhibits a delay between the end of the control signal and the return of the square wave to substantially its previous voltage value is not more than about 200 nanoseconds, such that the output of the switching means precisely presents substantially a square wave controlling the illumination of the flash lamp.

25. An apparatus as defined in claim 21 wherein the plateau voltage is substantially equal to the first voltage.

26. An apparatus as defined in claim 21 wherein the switching means comprises a semiconductor device connected to the capacitive means such that the current through the semiconductor device passes through the flash lamp.

27. An apparatus as defined in claim 26 wherein the semiconductor device comprises a transistor and wherein the first voltage is at least about 400 volts and the current is at least 50 amps.

28. An apparatus as defined in claim 26 wherein the switching means further comprises an optical isolation device.

29. An apparatus for controlling the output of a laser used in medical procedures, the apparatus comprising:

a laser comprising a laser medium and a flash lamp configured to input energy to the laser medium, the laser operating in a Q switched mode whereby one, two, or three laser beam pulses are emitted for each illumination of the flash lamp, each pulse being less than 10 nanoseconds long;

supply means for providing a first voltage;

capacitive means, connected to the supply means, for storing a charge;

control means for determining when the flash lamp should be turned on and turned off in accordance with whether one, two, or three laser beam pulses are desired, the control means generating a control signal indicating the time the flash lamp should be turned on and turned off; and switching means for electrically connecting the capacitive means to the flash lamp for substantially the length of time indicated by the control signal, the switching means providing an output which is substantially a square wave having a plateau voltage, the switching means limiting the value of the current passing through the flash lamp to substantially a predetermined value and the length of the square wave being adjustable in accordance with the control signal such that the length of the time which the flash lamp is illuminated can be precisely adjusted and the current passing through the flash lamp is limited to a desired value, the switching means providing the square wave causing the illumination of the flash lamp and the firing of either a one, two, or three laser beam pulses upon command of a user.

30. A method for controlling the output of a laser used in medical procedures, the laser comprising a laser medium and a flash lamp configured to input energy to the laser medium, the laser operating in a Q switched mode whereby one, two, or three laser beam pulses, each pulse being less than 10 nanoseconds long, for each illumination of the flash lamp, the method comprising the steps of:

supplying a first voltage;

storing a charge;

determining when the flash lamp should be turned on and turned off in accordance with whether one, two, or three laser beam pulses are desired and generating a control signal indicating the time the flash lamp should be turned on and turned off, the determination when the flash lamp should be turned on and turned off being predetermined by a user of a user in the medical procedure;

switching the charge in series with the flash lamp for substantially the length of time indicated by the control signal to provide an output which is substantially a square wave having a plateau voltage; and limiting the value of the current passing through the flash lamp to substantially a predetermined value with the length of the square wave being adjustable in accordance with the control signal such that the length of the time which the flash lamp is illuminated can be precisely adjusted and the current passing through the flash lamp is limited to a desired value and such that the laser medium selectively fires one, two, or three laser beam pulses for the time that the charge is switched in series with the flash lamp.

31. A method for adjustable controlling the output of a laser to a desired level, the laser comprising a laser medium and a flash lamp configured to input energy to the laser medium, the method comprising the steps of:

(a) firing the laser;

(b) measuring the output the laser and determining if an adjustment of the output of the laser is necessary to achieve an output desired by a user on the next firing and generate a desired output signal;

(c) supplying a voltage at least as great as 200 volts;

(d) storing a charge;

(e) determining when the flash lamp should be turned on and turned off in order to adjust the output of the laser to the desired level in accordance with the desired output signal and generating a control signal;

(f) determining the current to be input to the flash lamp to set the output of the laser at a desired level;

(g) switching the charge to be in connection with the flash lamp for a period of time indicated by the control signal and outputting a square wave having a plateau voltage, the value of the current passing through the flash lamp being limited to substantially the value indicated by the control signal and the length of the square wave being adjustable in accordance with the control signal such that the length of the time which the flash lamp is illuminated can be adjusted and the current passing through the flash lamp can also be adjusted to yield a desired flash lamp brightness in accordance with the value desired by a user;

(h) repeating steps (a) through (g) and adjusting the time when the flash lamp should be turned on and turned off and adjusting the current to be input to the flash lamp to set the output of the laser at a desired level.

32. An apparatus for adjustable controlling the output of a laser comprising:

a laser medium;

a flash lamp configured to input energy to the laser medium;

voltage supply means for providing a voltage at least as great as 200 volts;

means for measuring the output the laser medium;

capacitive means, connected to the voltage supply means, for storing electrons;

control means, connected to the means for measuring, for determining when the flash lamp should be turned on and turned off and for determining the current to be input to the flash lamp to set the output of the laser at a desired level, the control means generating a control signal; and switching means for electrically connecting the capacitive means to the flash lamp, the switching means providing an output which is substantially a square wave having a plateau voltage, the switching means limiting the value of the current passing through the flash lamp to substantially the value indicated by the control signal and the length of the square wave being adjustable in accordance with the control signal such that the length of the time which the flash lamp is illuminated can be adjusted and the current passing through the flash lamp can also be adjusted to yield a desired flash lamp brightness and wherein the switching means exhibits a delay between initiation of the control signal and the rise of square wave to substantially the plateau voltage being not greater than about 100 nanoseconds and wherein the switching means exhibits a delay between the end of the control signal and the return of the square wave to substantially its previous voltage value is not more than about 200 nanoseconds, such that the output of the switching means precisely presents substantially a square wave controlling the illumination of the flash lamp.

33. An apparatus for adjustable controlling the output of a laser as defined in claim 32 further comprising means for attenuating the laser output, the means for attenuating being connected to the control means.

34. An apparatus as defined in claim 32 wherein the voltage is at least as great as 400 volts DC and the apparatus further comprises means for stepping up the voltage to a voltage at least as great as 10,000 volts DC.

35. An apparatus as defined in claim 32 wherein the control means comprises a microprocessor.

36. An apparatus as defined in claim 32 wherein the plateau voltage is substantially equal to the first voltage.

37. An apparatus as defined in claim 32 wherein the switching means comprises a semiconductor device connected to the capacitive means such that the current through the semiconductor device passes through the flash lamp.

38. An apparatus as defined in claim 32 wherein the semiconductor device comprises a transistor and wherein the first voltage is at least about 400 volts and the current is at least 50 amps.

* * * * *